US012798512B2

(12) United States Patent
Hong et al.

(10) Patent No.: US 12,798,512 B2
(45) Date of Patent: Nov. 17, 2026

(54) VEHICLE SENSOR DEVICE AND SEAT BELT RETRACTOR TO WHICH SAME IS APPLIED

(71) Applicant: AUTOLIV DEVELOPMENT AB, Vargarda (SE)

(72) Inventors: Hyeon Ki Hong, Gyeonggi-do (KR); Ho Beom Yoon, Gyeonggi-do (KR); Chan Ki Moon, Gyeonggi-do (KR); Hyeon Kyu Kang, Gyeonggi-do (KR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 19/118,205

(22) PCT Filed: Sep. 13, 2023

(86) PCT No.: PCT/KR2023/013721
§ 371 (c)(1),
(2) Date: Apr. 3, 2025

(87) PCT Pub. No.: WO2024/076026
PCT Pub. Date: Apr. 11, 2024

(65) Prior Publication Data

US 2026/0138558 A1 May 21, 2026

(30) Foreign Application Priority Data

Oct. 5, 2022 (KR) ........................ 10-2022-0127375

(51) Int. Cl.
*B60R 22/34* (2006.01)
*B60R 22/405* (2006.01)
*B60R 22/48* (2006.01)

(52) U.S. Cl.
CPC ........ *B60R 22/3416* (2013.01); *B60R 22/405* (2013.01); *B60R 22/48* (2013.01);
(Continued)

(58) Field of Classification Search
CPC ... B60R 22/3416; B60R 22/405; B60R 22/48; B60R 2022/3402; B60R 2022/4808
See application file for complete search history.

(56) References Cited

U.S. PATENT DOCUMENTS 4,991,874 A * 2/1991 Tsuge ...................... B60R 22/40
280/806
6,299,093 B1 * 10/2001 Harte .................... B60R 22/405
242/384.6

(Continued)

FOREIGN PATENT DOCUMENTS

JP 2000-025569 A 1/2000
JP 2010-167845 A 8/2010

(Continued)

OTHER PUBLICATIONS

Computer generated English translation of JP 2010-167845 (Year: 2010).*

(Continued)

*Primary Examiner* — Jason D Shanske
*Assistant Examiner* — Tiffany L Webb
(74) *Attorney, Agent, or Firm* — Dickinson Wright PLLC

(57) ABSTRACT

A vehicle sensor device and a seat belt retractor to which same is applied, the retractor comprising: a steering disc which is disposed at one side of a spindle, and which rotates according to the insertion or withdrawal of seat belt webbing; a bearing plate in which the steering disc is accommodated; a sensor housing provided to be rotatable on the basis of changes in the provision angle of the bearing plate and in the inclination of an object to be mounted; a ball moving in the sensor housing according to changes in the inclination and acceleration of a vehicle; an upper cover disposed above the ball, and disposed to be rotatably disposed according to the movement of the ball; and a pilot (Continued)

lever, which rotates by means of the rotation of the upper cover.

5 Claims, 7 Drawing Sheets

(52) U.S. Cl.
CPC ................. *B60R 2022/3402* (2013.01); *B60R 2022/4808* (2013.01)

(56) References Cited

U.S. PATENT DOCUMENTS

| | | | | |
|---|---|---|---|---|
| 6,443,332 | B1 | 9/2002 | Costea | |
| 6,499,554 | B1 | 12/2002 | Yano et al. | |
| 10,239,486 | B2 * | 3/2019 | Huh | B60R 22/405 |
| 10,919,489 | B2 * | 2/2021 | Shinya | B60R 22/48 |
| 11,148,635 | B2 * | 10/2021 | Ito | B60R 22/40 |

FOREIGN PATENT DOCUMENTS

| | | | |
|---|---|---|---|
| JP | 2014-234108 | A | 12/2014 |
| JP | 2017-024457 | A | 2/2017 |
| KR | 10-0468923 | B1 | 2/2005 |
| KR | 10-1766844 | B1 | 8/2017 |
| KR | 10-2439218 | B1 | 9/2022 |

OTHER PUBLICATIONS

Computer generated English translation of JP 2014-234108 (Year: 2014).*

* cited by examiner

VEHICLE SENSOR DEVICE AND SEAT BELT RETRACTOR TO WHICH SAME IS APPLIED

TECHNICAL FIELD

The disclosure relates to a seat belt retractor, and more particularly, to a vehicle sensor device which senses changes in inclination and acceleration of a vehicle and prevents a seat belt from being pulled out, and a seat belt retractor employing the same.

BACKGROUND ART

In general, a vehicle is equipped with a seat belt safety device in a seat to ensure the safety of an occupant.

The seat belt safety device includes a retractor which operates to allow a band-shaped seat belt webbing (hereinafter, referred to as a "webbing") for fixing an occupant to be wound on a spool, or to be pulled out, and a buckle into which a tongue fixed at one end of the webbing is removably inserted.

The retractor prevents an occupant wearing the seat belt from being bounced forward or moved away from a seat due to driving inertia when the vehicle suddenly stops or accelerates due to a vehicle accident. Such a retractor may include a device that allows the webbing to be pulled out in a normal state when the occupant wears the seat belt, but, when a change in the pulling-out acceleration of the webbing or the inclination of the vehicle is detected due to a vehicle collision, prevents the webbing from being further pulled out, and an emergency tensioning device and a pretensioning device that reduce looseness or hanging of the webbing, that is, slack of the webbing.

For example, in Patent Document 1 and Patent Document 2 below, a retractor technique for controlling winding and unwinding operations of a seat belt webbing is disclosed.

The applicant of the present invention has filed a patent application that discloses a seat belt retractor having a vehicle sensor with an improved fixing structure as in Patent Document 3 below, and have received the registration of the patent.

When an acceleration exceeding a predetermined value is applied to the retractor in the horizontal direction or the inclination of the vehicle is changed, such as when the vehicle collision occurs, a vehicle sensor that detects the acceleration or inclination is applied to the retractor to prevent the seat belt from being pulled out by operating a locking device of the seat belt.

A vehicle sensor using a ball as an inertial member or an independent inertial member is generally known in the art.

For example, the vehicle sensor includes an inertial member that moves in a dangerous situation where a deceleration higher than a normal deceleration of the webbing or an inclination is applied to the vehicle, and a sensor lever that interworks with external teeth of a control disc which is moved by the inertia member and rotates together with a spool of the seat belt retractor.

That is, the vehicle sensor of the related-art seat belt retractor measures the inclination of a vehicle by applying a gimbal having a weight therein. Such a vehicle sensor may measure the inclination of the vehicle even if the angle of the backrest provided on the seat is changed.

Meanwhile, as autonomous vehicles are developing recently, a technology for minimizing volumes of a seat and a seat belt retractor applied to a vehicle, and increasing the rotation angle of the backrest of the seat is developing. In addition, an integrated seat belt (Belt In Seat (BIS)) that is integrated into a seat may be applied.

However, when the rotation angle of the seat in which the related-art seat belt retractor is installed, for example, the backrest, exceeds a predetermined angle range, there occur limitations on the mechanism due to component interference, and hence, there is a problem that normal operations of the seat belt retractor are impossible.

Accordingly, there is a need for development of a seat belt retractor technology employing a vehicle sensor, which can extend an angle range for measuring an inclination as the rotation angle of a backrest increases.

(Patent Document 1) U.S. Pat. No. 6,499,554 (registered on Dec. 31, 2002)

(Patent Document 2) U.S. Pat. No. 6,443,332 (registered on Sep. 3, 2002)

(Patent Document 3) Korean Patent Registration No. 10-1766844 (issued Aug. 9, 2017)

DISCLOSURE OF INVENTION

Technical Problem

An object of the disclosure is to solve the above-described problems, and is to provide a vehicle sensor device for sensing changes in inclination and acceleration of a vehicle, and a seat belt retractor employing the same.

Another object of the disclosure is to provide a vehicle sensor device which can extend an angle range in which a change in inclination can be measured as the rotation angle of a backrest increases, and a seat belt retractor employing the same.

Still another object of the disclosure is to provide a vehicle sensor device which has a simple structure, thereby improving workability during manufacturing and reducing a manufacturing cost, and a seat belt retractor employing the same.

Solution to Problem

To achieve the above-described objects, a vehicle sensor device according to the disclosure may include: a steering disk which is disposed on one side of a spindle and rotates according to a retraction operation or a pulling-out operation of a seat belt webbing; a bearing plate in which the steering disk is accommodated; a sensor housing which is installed to be rotatable based on an installation angle of the bearing plate and a change in an inclination of an object to be mounted; a ball which moves in the sensor housing according to a change in the inclination and acceleration of the vehicle; an upper cover which is disposed on an upper portion of the ball and is rotatably disposed according to movement of the ball; a pilot lever which rotates in contact with the upper cover by rotation of the upper cover to be coupled to or decoupled from the steering disk; and a lock canceller lever which releases the contact with the steering disk and the pilot lever to rotate the steering disk, enabling the seat belt webbing to be retracted and pulled out.

In addition, to achieve the above-described objects, a seat belt retractor employing a vehicle sensor device according to the disclosure may include: the vehicle sensor device which detects a change in the inclination of a vehicle and a change in the pulling-out acceleration of a seat belt webbing; and a spindle around which the seat belt webbing is wound, and the seat belt retractor may rotate a pilot lever to be coupled to or decoupled from a steering disk based on the detected change in the inclination of the vehicle and the pulling-out acceleration of the webbing.

Advantageous Effects of Invention

As described above, the vehicle sensor device and the seat belt retractor employing the same according to the disclosure may achieve the effects of enhancing the structures of the wobble gear, the lock canceller lever, and the ALR lever, applied to the vehicle sensor device, to be simple, and extending the angle range to respond to a change in the angle of an object where the seat belt retractor is mounted, for example, the backrest.

In addition, according to the disclosure, the structure of the vehicle sensor device is simplified, so that there are effects of improving workability during manufacturing and reducing a manufacturing cost.

BEST MODE FOR CARRYING OUT THE INVENTION

Hereinafter, a vehicle sensor device and a seat belt retractor employing the same according to preferred embodiments of the disclosure will be described in detail with reference to the accompanying drawings.

Prior to explaining a configuration of the seat belt retractor according to preferred embodiments of the disclosure, a configuration of a seat belt retractor according to related-art technology will be roughly explained with reference to FIG. 1.

Figure 1:
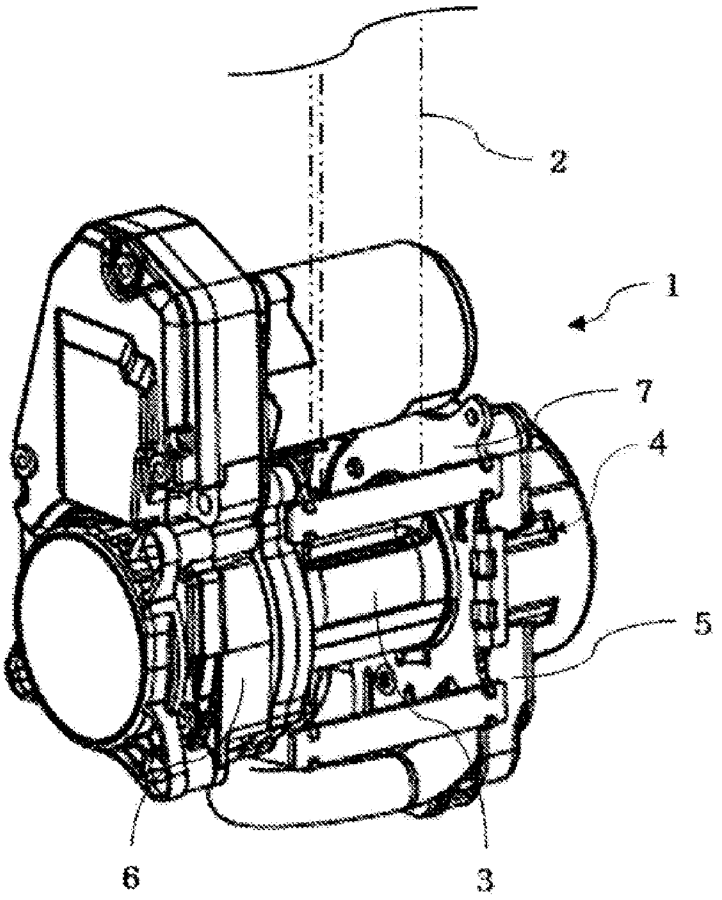
FIG. 1 is a view illustrating an example of a related-art seat belt retractor.
Figure 2:
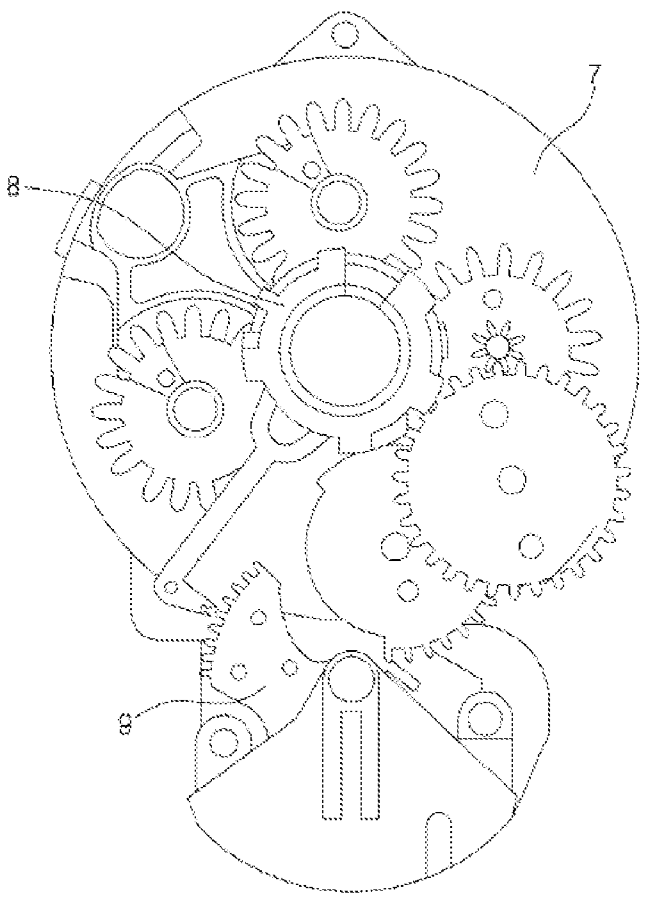
FIG. 2 is a view illustrating an example of a sensor unit illustrated in FIG. 1.

FIG. 1 is a view illustrating an example of a related-art seat belt retractor and FIG. 2 is a view illustrating an example of a sensor unit illustrated in FIG. 1.

As shown in FIG. 1, the related-art seat belt retractor 1 may include a spindle 3 on which a seat belt webbing (hereinafter, referred to as a 'webbing') 2 is wound, a sensor unit 4 that detects an inclination of the vehicle, an emergency tensioning unit 5 that reduces slack by winding the webbing 2 upon a vehicle collision, and a pretensioning unit 6 that smoothly pulls out the webbing 2 during normal driving of the vehicle and reduces slack by winding the webbing 2 just before a vehicle collision.

The sensor unit 4 detects a change in the pulling-out acceleration of the webbing 2 or a change in the inclination of the vehicle caused by a vehicle collision.

The emergency tensioning unit 5 may operate an inflater (not shown) having gunpowder embedded therein according to a detection signal that detects a vehicle collision, and may wind the webbing 2 on the spindle 3 by using a pressure of a generated gas. Accordingly, the emergency tensioning unit 5 may reduce an injury value of a passenger by reducing slack of the webbing 2 by winding the webbing 2 upon a vehicle collision.

When a vehicle collision is predicted through a sensor applied to the vehicle, the pretensioning unit 6 may wind the webbing 2 on the spindle by operating a motor which is capable of rotation and reverse rotation. That is, when the vehicle travels normally, the pretensioning unit 6 may keep the tension of the worn webbing 2 and prevent the webbing 2 from being loosened until a stronger acceleration or deceleration of the vehicle occurs even if there is no accident, and may reduce an injury value of a passenger by reducing slack of the webbing 2 by winding the webbing 2 just before a vehicle collision.

Here, the spindle 3 is installed inside a fixing frame 7, and the sensor unit 4, the emergency tensioning unit 5, and the pretensioning unit 6 are disposed on both sides of the fixing frame 7, and left and right housings are coupled to the outside of each unit.

That is, the respective units 4, 5, 6 are disposed on both sides of the spindle 2 along a traverse direction.

Along with these, the related-art seat belt retractor 1 may provide an automatic locking retractor (ALR) function to fix an item such as a buggy seat to a seat of the vehicle by using the webbing 2, and a lock canceling function to disable the locking function of preventing the webbing from being pulled out.

When a clutch lever 8 for turning on or off the sensing function using the sensor unit 4 does not control the rotational motion of a ball housing 9 provided in the sensor unit 4, the related-art seat belt retractor 1 configured as described above may adjust the installation angles of a weight body of the sensor unit 4 and the ball housing 9 within a pre-set angle, for example, a range from about 0° to about 45°.

However, when the installation angles of the weight body and the ball housing 9 exceed the adjustable angle range in the process of adjusting the angle of the backrest, the related-art seat belt retractor 1 may have a problem that normal operations of the sensor unit 4 are impossible.

In addition, as the units for providing the ALR function and the lock canceling function described above are configured by applying a plurality of gears, the related-art seat belt retractor 1 may have problems that the structure is complex and the working time and the manufacturing cost increase during manufacturing.

To solve these problems, the disclosure improves connection structures of the sensor unit 4 and the units for providing the ALR and lock canceling functions to be simple, and extends the angle range to respond to a change in the angle of the backrest.

Figure 3:
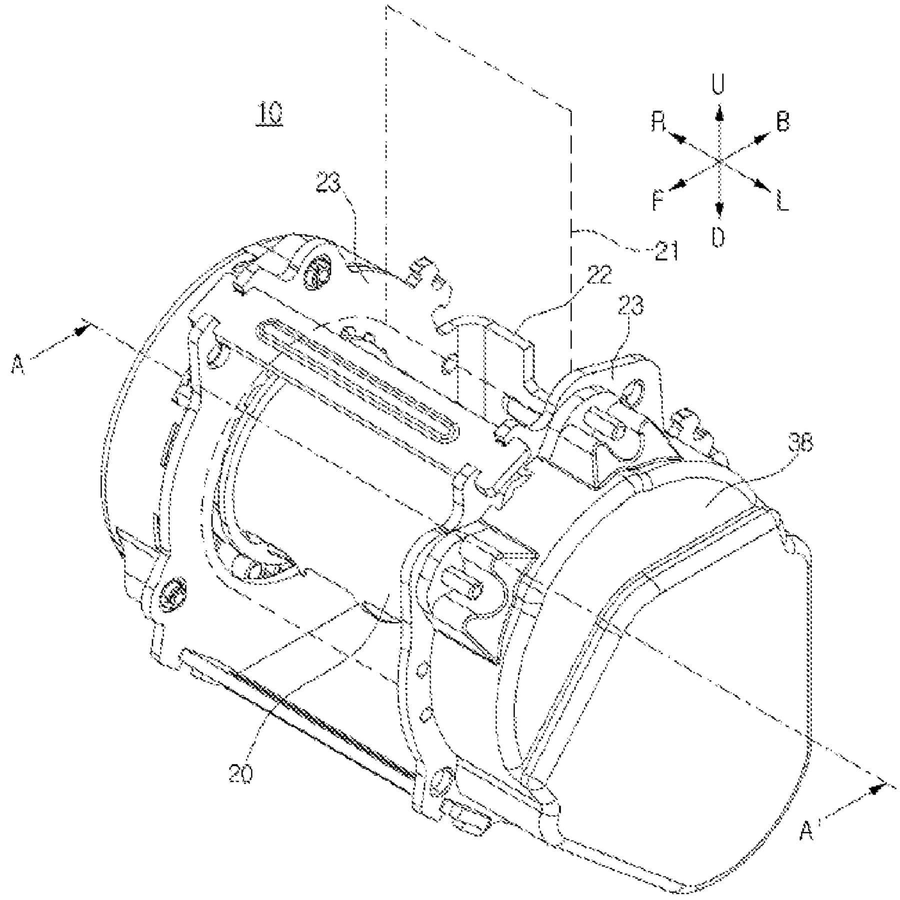
FIG. 3 is a perspective view of a seat belt retractor to which a vehicle sensor device is applied according to a preferred embodiment of the disclosure.
Figure 4:
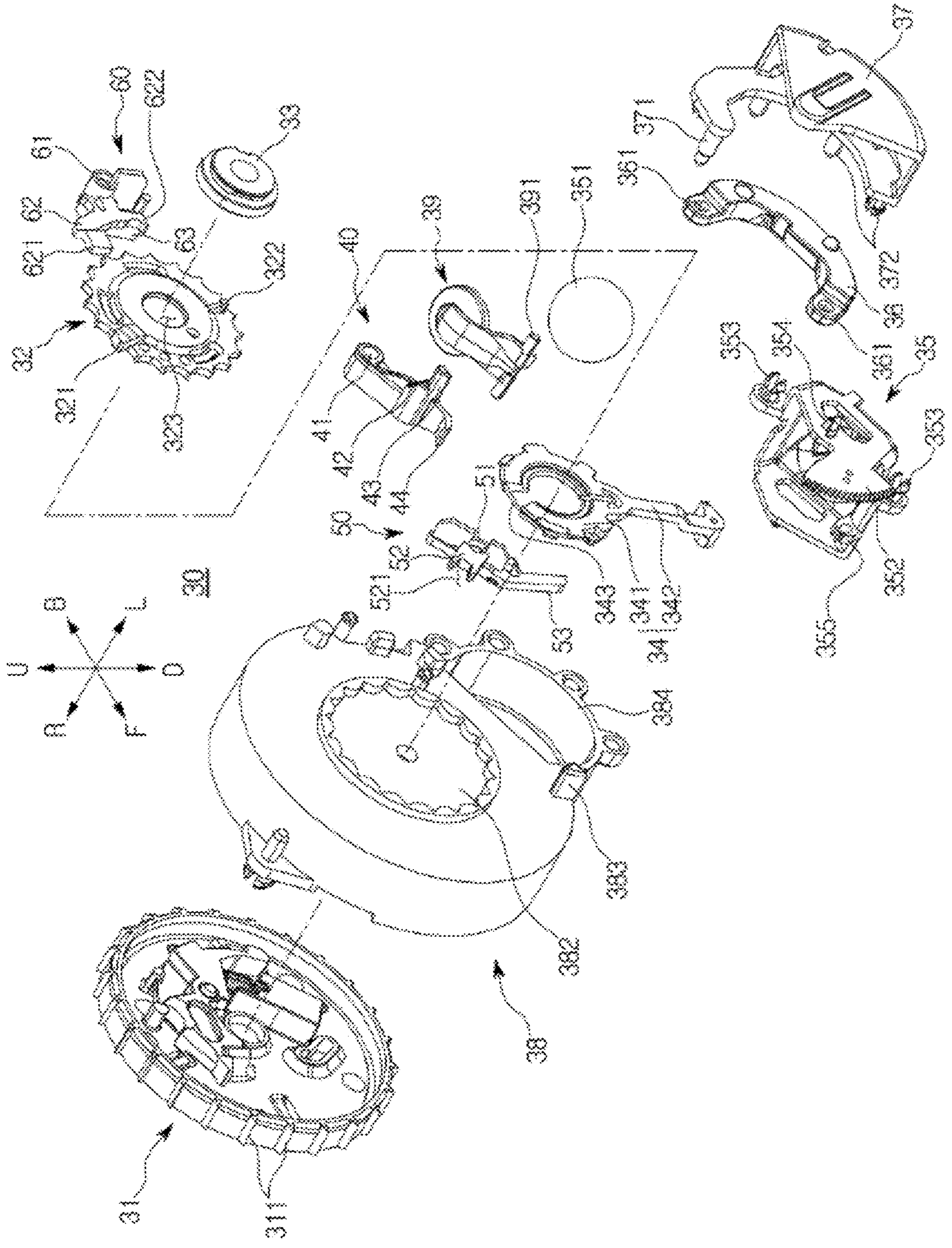
FIG. 4 is an enlarged perspective view of the vehicle sensor device shown in FIG. 3.
Figure 5:
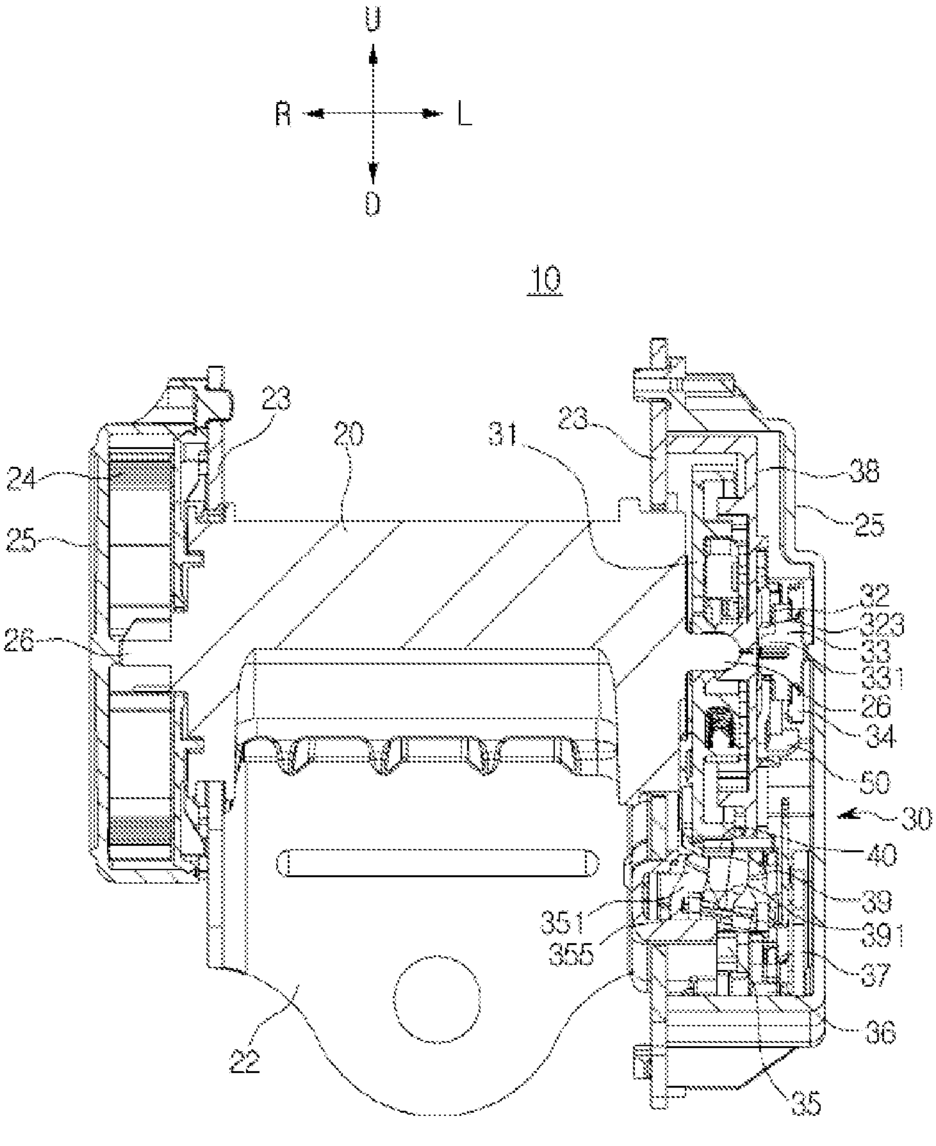
FIG. 5 is an exploded perspective view of the vehicle sensor device shown in FIG. 4.

FIG. 3 is a perspective view of a seat belt retractor to which a vehicle sensor device is applied according to a preferred embodiment of the disclosure, FIG. 4 is an enlarged perspective view of the vehicle sensor device illustrated in FIG. 3, and FIG. 5 is an exploded perspective view of the vehicle sensor device illustrated in FIG. 4.

Hereinafter, a direction in which a steering wheel is installed with reference to a seat is referred to as a 'forward direction (F),' and the opposite direction thereof is referred to as a 'backward direction (B).' In addition, terms indicating directions such as 'left side (L),' 'right side (R),' 'upward direction (U),' and 'downward direction (D)' are defined to indicate respective directions with reference to the forward direction (F) and the backward direction (B) described above.

In the present embodiment, a configuration of a seat belt retractor applied to an integrated seat belt (BIS) that is integrally mounted in a seat will be described.

Of course, the disclosure is not limited thereto, and it should be noted that seat belt retractors of various structures and shapes may be provided to be applied not only to an integrated seat belt but also to a normal vehicle or an autonomous vehicle.

As shown in FIG. 3, the seat belt retractor 10 to which the vehicle sensor device is applied according to a preferred embodiment of the disclosure includes a spindle 20 around which a seat belt webbing (hereinafter, referred to as a 'webbing') 21 is wound, and a vehicle sensor device (hereinafter, referred to as a 'sensor unit') 30 which detects a change in the inclination of the vehicle and a change in the pulling-out acceleration of the webbing 21.

Along with these, the seat belt retractor 10 to which the vehicle sensor device is applied according to a preferred embodiment of the disclosure may further include an emergency tensioning unit (not shown) which reduces slack by winding the webbing 21 when an emergency situation such as a vehicle collision occurs, and a pretensioning unit (not shown) which smoothly pulls out the webbing 21 during normal driving of the vehicle, and reduces slack by winding the webbing 21 right before an emergency situation occurs.

The sensor unit 30 may be provided as a vehicle sensor device including an acceleration sensor to detect a change in the pulling-out acceleration and an inclination sensor to detect a change in the inclination of the vehicle.

In the present embodiment, it is illustrated that both the change in the inclination of the vehicle and the change in the pulling-out acceleration of the webbing 21 are detected by using the sensor unit 30.

The spindle 20 may be installed between both sidewalls 23 of a fixing frame 22.

The spindle 20 may be formed in a substantially cylindrical shape, and the webbing 21 having one side end fixed may be wound along an outer surface of the spindle 20 multiple times, and in this state, may be wound or unwound according to a driving state of the vehicle.

The fixing frame 22 may be formed in a substantially '∩' shape when viewed from above, and the spindle 20 may be installed by penetrating through the both sidewalls 23 of the fixing frame 22.

Here, an elastic member 24 may be installed on one side of the fixing frame 22, the left side end when viewed on FIG. 3, to provide a restoring force to the spindle 22.

The sensor unit 30 may be installed on the other side of the fixing frame 22, the right side end when viewed on FIG. 3.

A pair of covers 25 may be installed on both ends of the fixing frame 22, respectively, to shield outer surfaces of the elastic member 24 and the sensor unit 30.

As shown in FIGS. 3 to 5, the sensor unit 30 may include a steering disk 31, a wobble gear 32, and a center gear 33 which are coupled to the left side end of the spindle 20, a clutch lever 34 which is rotatably coupled to the center gear 33, a sensor housing 35 which rotates according to a change in the inclination, a weight body 36 and an adapter 37 which apply a weight to the sensor housing 35, and a pilot lever 40 which is connected to one end of the adapter 37.

The sensor unit 30 may further include a lock canceller lever 50 and an ALR lever 60.

Here, one pair of coupling shafts 26 may protrude from both side ends of the spindle 20. Therefore, one end of the elastic member 24 may be coupled to the coupling shaft 26 formed on the right side end of the spindle 20, and the coupling shaft 26 formed on the left side end of the spindle 20 may be coupled with the center gear 33 through the steering disk 31 and the wobble gear 32.

Here, the center gear 33 may rotate in response to the rotation of the spindle 20 while being coupled to the coupling shaft 26. On the other hand, the steering disk 31 and the wobble gear 32 may be connected such that the rotational force of the spindle 20 is not directly transmitted.

The steering disk 31 may be rotatably installed on one side of the fixing frame 22 to rotate in association with the retraction or pulling-out operation of the webbing 21 when the webbing 21 is pulled out or retracts. A plurality of locking protrusions 311 may protrude from the outer surface of the steering disk 31.

The surfaces of the plurality of locking protrusions 311 that come into contact with the pilot lever 40 or an extension member 63 of the ALR lever 60, which will be described later, when the webbing 21 is retracted, may be formed to be inclined relative to a tangential line, and the surfaces that come into contact with the pilot lever 40 or the extension member 63 when the webbing 21 is pulled out may be formed to be perpendicular to the tangential line.

Accordingly, the steering disk 31 may enable retraction of the webbing 21 and may disable the pulling-out of the webbing 21 when the pilot lever 40 or the extension member 63 is in contact with the outer surface of the steering disk 31.

To achieve this, the plurality of locking protrusions 311 may be provided to be spaced apart from one another by a predetermined distance along the circumferential direction of the steering disk 31 to rapidly restrict the rotational motion by the pilot lever 40.

That is, the steering disk 31 may be selectively restricted by the contact with the pilot lever 40. The steering disk 31 may be formed in a substantially disk shape or cylindrical shape. The steering disk 31 may be accommodated in an inner space of a bearing plate 38 which is coupled to the sidewall 23 disposed on the left side of the fixing frame 22.

The wobble gear 32 may be rotatably installed on a plate surface of the bearing plate 38 to perform a function of rotating the lock canceller lever 50 and the ALR lever 60.

To achieve this, the wobble gear 32 may be formed in a substantially disk shape, and may have a plurality of teeth protruding from the outer circumference of the wobble gear 32 at positions spaced apart from one another by a predetermined distance.

A support protrusion 383 may protrude from an inner surface of the bearing plate 38, that is, the center of the right side surface, to support the coupling shaft 26, and an external gear portion 382 may be recessed on an outer surface of the bearing plate 38, that is, on the left side surface, to circumscribe the teeth of the wobble gear 32.

The external gear portion 382 may have teeth which are one more than the teeth formed on the wobble gear 32 to configure a gerotor. That is, the wobble gear 32 may be disposed to have its center eccentric from the center of the external gear portion 382, that is, the coupling shaft 26, and may be movable up, down, left, and right. Accordingly, the wobble gear 32 may rotate in the opposite direction of the rotation direction of the spindle 20 with one or more teeth formed on the upper portion thereof being engaged with the teeth of the external gear portion 382 in sequence.

A first interlocking protrusion 321 may protrude from one side of the plate surface of the wobble gear 32 to a predetermined height along the thickness direction of the wobble gear 32, and a second interlocking protrusion 322 may protrude from the other side of the plate surface of the wobble gear 32 to a predetermined height along the thickness direction of the wobble gear 32.

The center gear 33 may be inserted into the center of the wobble gear 32 to be coupled to the coupling shaft 26, and may generate a friction on the contact surface with the wobble gear 32. That is, the center gear 33 may have a coupling shaft portion 331 protruding from the right side surface thereof to be coupled with an insertion hole 323 formed on the center of the wobble gear 32. Here, the coupling shaft portion 331 may have an outer diameter that is slightly smaller than the diameter of the insertion hole 323 formed on the wobble gear 32.

Therefore, due to the rotational motion of the center gear 33 caused by the rotation of the coupling shaft 26, the wobble gear 32 may slightly move up, down, left, and right within the external gear portion 382 of the bearing plate 38, and may rotate with the teeth of the wobble gear 32 being engaged with the teeth of the external gear portion 382 in sequence.

The clutch lever 34 may include a coupling portion 341 which is coupled to the center gear 33, and an extension portion 342 which lengthwise extends from one side of the coupling portion 341 to selectively come into contact with the sensor housing 35.

The coupling portion 341 may be formed in a substantially ring shape with one side open, and may be coupled to the outer circumference of the center gear 33 through the open one side and then may be maintained coupled to the outer circumference of the center gear 33 by a fixing member 343. The fixing member 343 may be provided as an elastic spring which is formed in a substantially arc shape.

A tooth may be formed at an end of the extension portion 342 to selectively engage with a teeth portion 352 of the sensor housing 35, which will be described below.

Here, a stopper 383 may protrude from one side of the bearing plate 38 to restrict a maximum rotation angle of the clutch lever 34 in a state in which the tooth of the extension portion 342 is released from the teeth portion 352.

The sensor housing 35 may have a ball 351 accommodated therein to move according to a change in the inclination of the vehicle, and may rotate forward and backward in response to the movement of the ball 351.

To achieve this, the sensor housing 35 may be formed in a cylindrical shape having a substantially arc-shaped cross section when viewed from the side, so that a space in which the ball 351 is accommodated is provided therein.

The teeth portion 352 may be formed on one side of the sensor housing 35, the left side when viewed in FIG. 4, and may have a plurality of teeth to selectively engage with the tooth formed on the extension portion 342 of the clutch lever 34.

One pair of coupling protrusions 353 may protrude from the front end and the rear end of the sensor housing 35 toward the left to allow the weight body 36 to be coupled thereto, respectively, and one pair of rotation shafts 354 may protrude from both sides of the center of the sensor housing 35 to be rotatably coupled to the bearing plate 38 and the adapter 37, respectively.

The ball 351 may be formed a spherical shape, and may have an upper cover 39 installed on an upper portion of the ball 351 to support movement of the ball 351.

The upper cover 39 may have the center formed to be convex upwardly so as to correspond to the shape of the upper end of the ball 351, and a shaft portion 391 may be provided on one side of the upper cover 39 to be rotatably coupled to a front portion of the sensor housing 35.

To achieve this, one pair of support plates 355 may protrude upward from the front portion of the sensor housing 35 to allow the shaft portion 391 of the upper cover 39 to be coupled thereto.

Here, the shaft portion 391 of the upper cover 39 may be coupled to be inclined toward one side, for example, the lower left side, between the one pair of support plates 355.

Therefore, the upper cover 39 may move up and down with reference to the shaft portion 391 in response to the movement of the ball 351 while contacting the upper end of the ball 351.

The weight body 36 may be formed in an arc shape that is substantially downwardly convex in cross section when viewed from the side, and one pair of coupling holes 361 may be formed on the front end and the rear end of the weight body 36 to allow the one pair of coupling protrusions 353 formed on the front end and the rear end of the sensor housing 35 to be coupled thereto, respectively.

The adapter 37 may be coupled to a space defining portion 384 extending from a lower portion of the bearing plate 38 to perform a function of shielding lower portions of the weight body 36 and the sensor housing 35. The space defining portion 384 may extend from the lower portion of the bearing plate 38 in a substantially 'U' shape so as to define a space in which the sensor housing 35 rotates. A plurality of fixing holes 385 may be formed along the edge of the space defining portion 384 to be spaced apart from one another.

Therefore, the adapter 37 may be formed in a substantially fan shape that is downwardly convex in cross section when viewed from the side, and a coupling groove may be formed on an upper end of the adapter 37 to be coupled to the rotation shaft 354 formed on the left side end of the sensor housing 35.

A rotation shaft portion 371 may be formed on an upper portion of the adapter 37 to be coupled to a rear end of the pilot lever 40 to allow the pilot lever 40 to rotate.

Along with these, a plurality of fixing protrusions 372 may protrude from the right side surface of the adapter 37 along the edge to be coupled to the fixing holes 385 of the space defining portion 384, respectively.

The pilot lever 40 may be formed in a substantially bar shape disposed along the forward and backward directions.

A through hole 41 may be formed at a rear end of the pilot lever 40 to allow the rotation shaft portion 371 of the adapter 37 to be coupled thereto, a first contact protrusion 42 may slightly protrude downward from substantially the center of the pilot lever 40 to be in contact with the upper surface of the upper cover 39, and a second contact protrusion 43 may protrude toward the left from the front side of the first contact protrusion 42 to be in contact with an inclined member 53 of the lock canceller lever 50.

Here, the second contact protrusion 43 may be formed to have a substantially triangular cross section to sharply protrude upward when viewed from the side. Therefore, the inclined member 53 may be in contact with an inclined surface of the second contact protrusion 43. The shape of the inclined surface of the second contact protrusion 43 may prevent a collision with the inclined member 53.

An inclined portion 44 may be formed at the front end of the pilot lever 40 to be inclined toward the front upper side. The inclined portion 44 may be caught by any one of the plurality of locking protrusion 311 formed on the steering disk 31 according to the rotation angle of the pilot lever 40 to control the steering disk 31 to be rotatable or unable to rotate.

The lock canceller lever 50 may be rotatably installed on one side of the wobble gear, and may perform a function of rotating the steering disk 31 by releasing the contact between the steering disk 31 and the pilot lever 40 in response to the rotation of the wobble gear 32.

The lock canceller lever 50 may include a fastening member 51 which is rotatably coupled to the plate surface of the bearing plate 38, a first interlocking member 52 which extends from one side of the fastening member 51 toward the wobble gear 32 and has an interlocking groove 521 formed at an end thereof, and the inclined member 53 which is formed to be inclined from one end of the fastening member 51 toward the front lower side to face the pilot lever 4, and comes into contact with the second contact protrusion 43 of the pilot lever 40.

The fastening member 51 may be formed in a substantially bar shape, and may be rotatably coupled to one side of the plate surface of the bearing plate 38 that is positioned in the proximity of the wobble gear 32.

The first interlocking member 52 may extend from one side of the fastening member 51 toward the wobble gear 32 by a predetermined length, and may function to rotate the lock canceller lever 50 in association with the movement of the second interlocking protrusion 322 formed on the wobble gear 32.

The interlocking groove 521 may be recessed on an end of the first interlocking member 52 to allow the second interlocking protrusion 322 to be inserted thereinto and separated therefrom, such that the second interlocking protrusion 322 smoothly comes into contact with and is separated from the first interlocking member 52.

The inclined member 53 may be formed to be inclined from one end of the fastening member 51 toward the front lower side to face the pilot lever 40. The inclined member 53 may come into contact with the second contact protrusion 43 of the pilot lever 40 in response to the rotation of the lock canceller lever 50. Then, the pilot lever 40 which is in contact with the locking protrusion 311 formed on the steering disk 31 may return to its original position, and coupling between the pilot lever 40 and the locking protrusion 311 may be released, so that the pulling-out operation of the webbing 21 may be enabled.

The ALR lever 60 may function to restrict or release the rotational motion of the steering disk 31 by causing one side to come into contact with or to be separated from one side of the steering disk 31 by interlocking with the lock canceller lever 50 or rotating in response to the wobble gear 32.

When an item such as a buggy seat is installed to be fixed to the seat of the vehicle by using the webbing 21, the ALR lever 60 may rotate when the webbing 21 is fully pulled out, making it possible to retract the webbing 21 and making it impossible to pull out the webbing 21. Accordingly, the ALR lever 60 may be always in contact with the steering disk 31 to enable the user to easily install the item such as the buggy seat on the seat of the vehicle, and to securely fix to the seat after installation.

The ALR lever 60 may include a fastening ring 61 which is rotatably coupled to the plate surface of the bearing plate 38 and has a ring shape, a second interlocking member 62 which extends from one side of the fastening ring 61 toward the wobble gear 32 and has an interlocking protrusion 621 protruding from one end thereof and a contact protrusion 622 protruding from the other end to come into contact with the rear end of the lock canceller lever 50, and an extension member 63 which extends from the other side of the fastening ring 61 by a predetermined length to allow an end to selectively come into contact with and to be separated from the steering disk 31, thereby restricting and releasing the rotational motion of the steering disk 31.

The fastening ring 61 may be provided as a substantially ring-shaped member that is rotatably coupled to the plate surface of the body 31 that is positioned in the proximity of the wobble gear 32 and the lock canceller lever 50 and has a predetermined thickness. Therefore, the fastening ring 61 may enable the ALR lever 60 to rotate by interlocking with the second interlocking protrusion 322 or the lock canceller lever 50.

The second interlocking member 62 may function to interlock with the second interlocking protrusion 323 and the lock canceller lever 50 substantially in contact therewith.

An interlocking protrusion 621 may protrude from one end of the second interlocking member 62 to come into contact with the second interlocking protrusion 322, and a contact member 622 may protrude from the other side of the second interlocking member 62 to come into contact with the lock canceller lever 50.

The extension member 63 may extend from the other side of the fastening ring 61 to a predetermined length to cause the end to selectively come into contact with and to be separated from the steering disk 31 to restrict and release the rotational motion of the steering disk 31. To achieve this, the extension member 63 may have the end inclined toward the outer surface of the wobble gear 32.

The end of the extension member 63 may be bent toward the wobble gear to restrict the rotational motion of the wobble gear 32 when coming into contact with the first interlocking protrusion 321 formed on the outer surface of the wobble gear 32, and a contact surface that contacts the second interlocking protrusion 322 may be formed to be flat to achieve a firm contact.

As described above, the disclosure may improve the structures of the wobble gear, the lock canceller lever, and the ALR lever, applied to the vehicle sensor device, to be simple, and may extend the angle range to respond to a change in the angle of an object where the seat belt retractor is installed, for example, the backrest.

In addition, the structure of the vehicle sensor device is simplified, so that workability may be enhanced and a manufacturing cost may be reduced.

Hereinafter, a method for operating the vehicle sensor device and the seat belt retractor employing the same according to a preferred embodiment of the present disclosure will be described in detail with reference to FIGS. 6 and 7.

Figure 6:
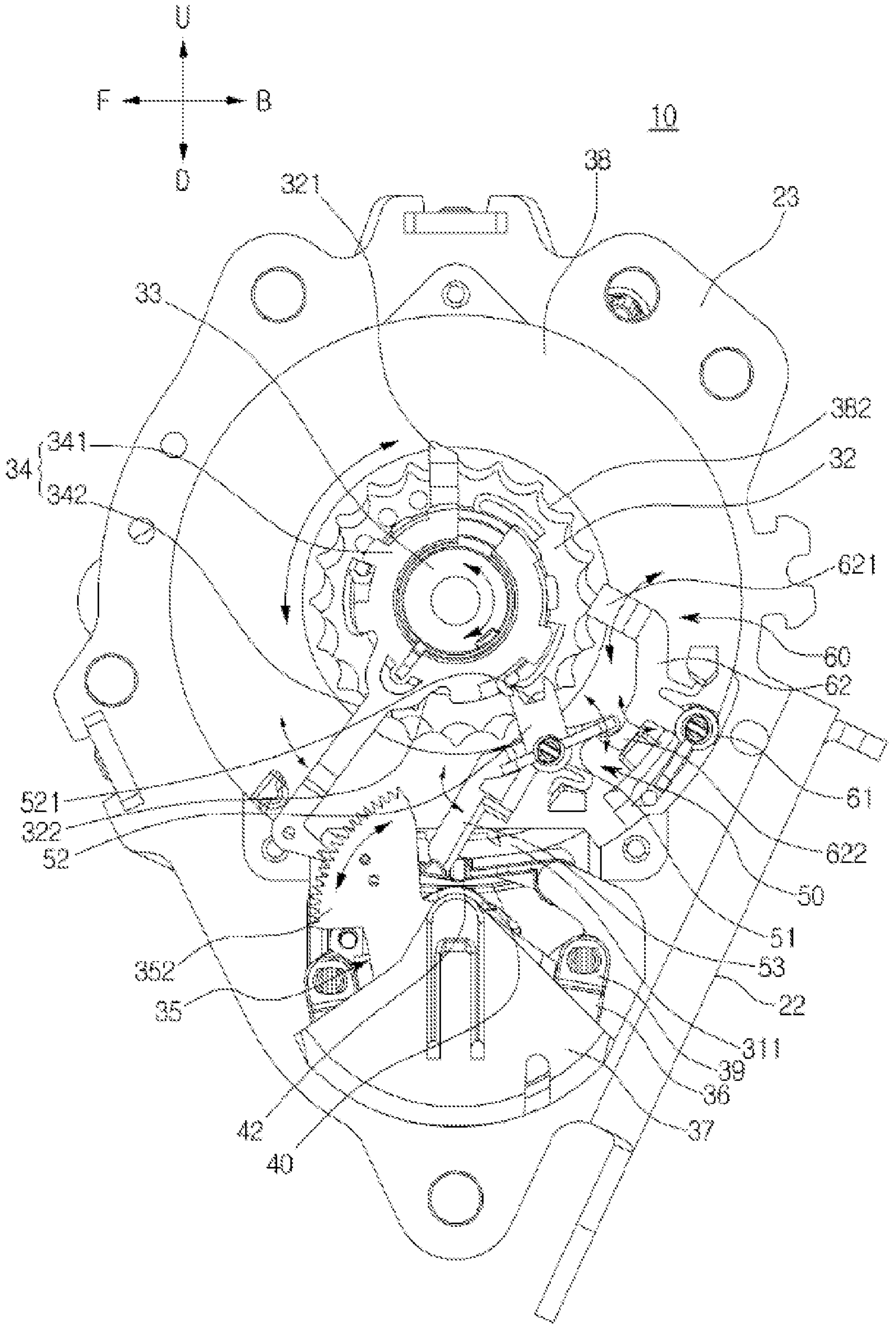
FIG. 6 is a view illustrating an operation state of the vehicle sensor device according to a preferred embodiment of the disclosure.
Figure 7:
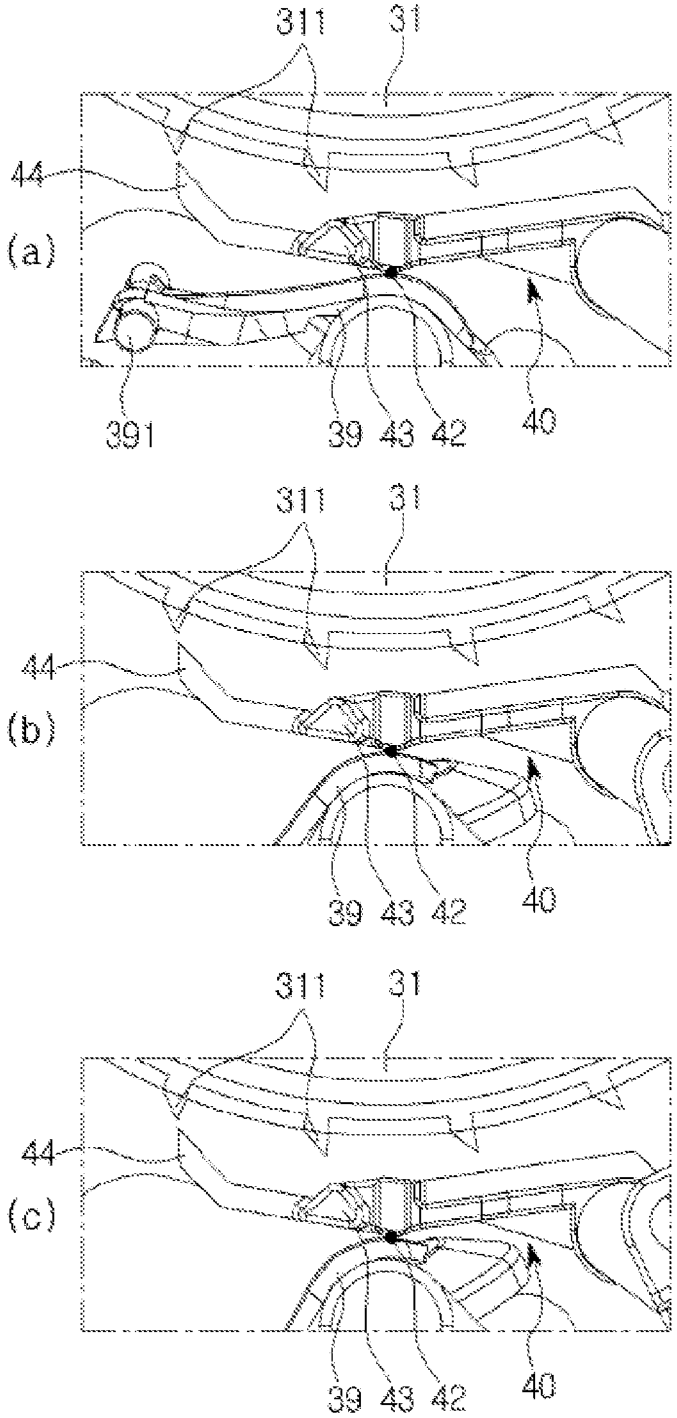
FIG. 7 is a view illustrating operation states of an upper cover and a pilot lever in the vehicle sensor device illustrated in FIG. 6.

FIG. 6 is a view illustrating an operation state of the vehicle sensor device according to a preferred embodiment of the disclosure, and FIG. 7 is a view illustrating operation states of the upper cover and the pilot lever in the vehicle sensor device illustrated in FIG. 6. FIGS. 7A to 7C illustrate the upper cover at angles of 0°, 45°, 60°, respectively.

As shown in FIG. 6, the vehicle sensor device 30, that is, the sensor unit 30, rotates forward and backward in response to the forward and backward rotation of the backrest while being installed in the seat belt retractor. In this case, the sensor housing 35 may always maintain a vertical arrangement state.

The clutch lever 34 may rotate to come into contact with the teeth portion 352 of the sensor housing 35 and to support the sensor housing 35, so that the sensor housing 35 may maintain its vertical arrangement state before the backrest inclines.

In a state where the end of the extension portion 342 of the clutch lever 34 is separated from the teeth portion 52 of the sensor housing 35 before the webbing 21 is pulled out, the steering disk 31 and the center gear 33 may rotate as the webbing 21 is pulled out, and the wobble gear 32 may rotate by the center gear 33. Therefore, the clutch lever 34 may be connected with the center gear 33 and may rotate in the same direction as the center gear 33 due to a tension of the fixing member 343 provided as a spring, and may rotate to come into contact with or to be released from the teeth portion 352 of the sensor housing 35 by the first interlocking protrusion 321 formed on the wobble gear 32.

Meanwhile, when the vehicle stops or normally travels, the ball 351 and the upper cover 39 may be maintained to be vertically disposed. Therefore, the pilot lever 40 may maintain the contact with the upper surface of the upper cover 38, and the webbing 21 may be free to be pulled out.

In this state, when a sudden external force is applied to the vehicle from the outside or the vehicle is tilted along the width direction as it passes through a sharp curve section, the ball 351 disposed in the sensor housing 33 may move, causing the upper cover 39 to rotate about the shaft portion 391. Then, the pilot lever 40 contacting the upper surface of the upper cover 39 may rotate upward and downward about the through hole 41 at the rear end.

As the pilot lever 40 rotates as described above, the inclined portion 44 of the front end of the pilot lever 40 may be caught by any one of the plurality of locking protrusions 311 formed on the outer circumference of the steering disk 31, thereby locking to prevent the webbing 21 from being pulled out.

As described above, the present disclosure may detect a change in the inclination of the vehicle and the inclination of the backrest, and a change in the pulling-out acceleration of the webbing by using the ball and the sensor housing, and may control the pilot lever.

Here, in all of the cases where the angles of the upper cover 39 are 0°, 45°, 60° as shown in FIGS. 7A to 7C, the first contact protrusion 42 of the pilot lever 40 may maintain the contact with the upper surface of the upper cover 39.

In this case, the end of the inclined portion 44 of the pilot lever 40 may maintain a constant distance to the locking protrusion 311 of the steering disk 31.

As described above, the disclosure may control the pilot lever to linearly reciprocate normally regardless of the angle at which the vehicle sensor device is rotated and disposed by adjusting the angle of the backrest.

That is, the disclosure may extend the angle range, such that the pilot lever 40 is normally controlled within the range from about 0° to 60° of the vehicle sensor device 30 that is changed by adjusting the angle of the backrest.

When the sensor housing 35 is fixed and the lock canceller function is enabled (on), the wobble gear 32 may rotate in the counter clockwise direction as viewed on FIG. 6, and the first interlocking member 52 of the lock canceller lever 50 may be pressed backward by the second interlocking protrusion 322.

Then, as the lock canceller lever 50 rotates about the fastening member 51 in the clockwise direction, the leading end of the inclined member 53 may press down the second contact protrusion 43 of the pilot lever 40, and the inclined portion 44 provided at the front end of the pilot lever 40 may rotate about the through hole 41 at the rear end of the pilot lever 40 in the counter clockwise direction, thereby being separated from the locking protrusion 311 of the steering disk 31 and fixed.

Accordingly, the webbing 21 may go into a state in which it can be freely pulled out or retracted by an operation force of an occupant.

On the other hand, when the lock canceller function is disabled (off), the wobble gear 32 may rotate in the counter clockwise direction and the first interlocking member 52 of the lock canceller lever 50 may be pressed forward by the second interlocking protrusion 322.

Then, as the lock canceller lever 50 rotates about the fastening member 51 in the counter clockwise direction, the leading end of the inclined member 53 may be released from the contact with the second contact protrusion 43 of the pilot lever 40, and the pilot lever 40 may be selectively coupled with or decoupled from the locking protrusion 311 of the steering disk 31 by the rotation of the upper cover 39 caused by the movement of the ball 351.

When the ALR function is enabled, the wobble gear 32 may rotate in the clockwise direction and the interlocking protrusion 621 of the second interlocking member 62 in the ALR lever 60 may be pressed backward by the first interlocking protrusion 321.

Then, as the ALR lever 60 rotates about the fastening ring 61 in the clockwise direction, the extension member 63 may come into contact with the locking protrusion 311 of the steering disk 31, thereby restricting the rotational motion of the steering disk 31.

Accordingly, when an item such as a buggy seat is installed on the seat of the vehicle by using the webbing 21, the ALR lever 60 may enable the webbing 21 to be retracted and may disable the webbing 21 to be pulled out in the state in which the webbing is fully pulled out. Accordingly, the ALR lever 60 may be always in contact with the steering disk 31 to enable the user to easily install the item such as the buggy seat on the seat of the vehicle, and to securely fix to the seat after installation.

On the other hand, when the ALR function is disabled (off), the wobble gear 32 may rotate in the clockwise direction and the first interlocking member 52 of the lock canceller lever 50 may be pressed backward by the second interlocking protrusion 322.

Then, as the lock canceller lever 50 rotates about the fastening member 51 in the clockwise direction, the contact protrusion 622 of the second interlocking member 62 of the ALR lever 60 may be pressed downward by the lock canceller lever 50.

In this case, as the ALR lever 60 rotates about the fastening ring 61 in the counter clockwise direction, the extension member 63 may be separated from the locking protrusion 311 of the steering disk 31. When the ALR function is disabled as described above, the steering disk 31 goes into the rotatable state.

Through the above-described process, the disclosure may enhance the structures of the wobble gear, the lock canceller lever, and the ALR lever, applied to the vehicle sensor device, to be simple, and may extend the angle range to respond to a change in the angle of an object where the seat belt retractor is installed, for example, the backrest.

In addition, the structure of the vehicle sensor device is simplified, so that workability may be enhanced and a manufacturing cost may be reduced.

Although the invention made by the inventors of the present application has been specifically described according to the above embodiments, the present disclosure is not limited to the above embodiments, and may be modified variously within a scope of the technical essence of the disclosure.

That is, the configuration of the integrated seat belt device integrated into the backrest of the seat has been described in the above-described embodiments, but the disclosure may be changed to be installed not only on the backrest of the seat, but also on the body of the vehicle, for example, a pillar disposed on a side surface of the vehicle, a body panel at a rear side of the seat, a roof or a under body of the vehicle.

In addition, the disclosure is not limited to the configuration of the seat belt retractor described with reference to FIG. 3, and may be changed to change the configuration of the seat belt retractor and to apply the vehicle sensor device to the changed seat belt retractor.

Industrial Applicability

The disclosure is applied to a vehicle sensor device which enhances connection structures of the sensor unit 4 and the units providing an ALR function and a lock canceling function to be simple, and extends an angle range to respond to a change in the angle of a backrest, and a seat belt retractor employing the same.

The invention claimed is:

1. A vehicle sensor device comprising:

a steering disk which is disposed on one side of a spindle and rotates according to a retraction operation or a pulling-out operation of a seat belt webbing;

a bearing plate in which the steering disk is accommodated;

a sensor housing which is installed to be rotatable based on an installation angle of the bearing plate and a change in an inclination of an object to be mounted;

a ball which moves in the sensor housing according to a change in the inclination and acceleration of a vehicle;

an upper cover which is disposed on an upper portion of the ball and rotatably disposed according to movement of the ball;

a pilot lever which rotates in contact with the upper cover by rotation of the upper cover to be coupled to or decoupled from the steering disk;

a lock canceller lever which releases the contact with the steering disk and the pilot lever to rotate the steering disk, enabling the seat belt webbing to be retracted and pulled out;

a wobble gear which is disposed on one side of the bearing plate and rotates in the opposite direction of a rotation direction of the spindle;

a center gear which penetrates through the wobble gear to be coupled to a coupling shaft of the spindle; and a clutch lever which is coupled to the sensor gear and is rotated by the wobble gear to selectively come into contact with or to be separated from the sensor housing, wherein the wobble gear has a first interlocking protrusion to rotate the clutch lever, and a second interlocking protrusion to rotate the lock canceller lever.

2. The vehicle sensor device of claim 1, wherein the pilot lever comprises a first contact protrusion which contacts an upper surface of the upper cover and a second contact protrusion which contacts the lock canceller lever, and an inclined portion which is selectively caught by any one of a plurality of locking protrusions formed on the steering disk to control the steering disk to be rotatable or unable to rotate.

3. The vehicle sensor device of claim 2, wherein the lock canceller lever comprises: a fastening member which is rotatably coupled to the bearing plate;

a first interlocking member which extends from one side of the fastening member toward the wobble gear and has an interlocking groove formed on an end thereof; and an inclined member which is formed to be inclined from one end of the fastening member toward the pilot lever and selectively comes into contact with the second contact protrusion of the pilot lever.

4. The vehicle sensor device of claim 1, further comprising:

an ALR lever which comes into contact with or is separated from one side of the steering disk to restrict or release a rotational motion of the steering disk, wherein the ALR lever comprises:

a fastening ring which is rotatably coupled to a plate surface of the bearing plate;

a second interlocking member which extends from one side of the fastening ring toward the wobble gear, and has an interlocking protrusion protruding from one end thereof, and a contact protrusion protruding from the other end thereof to come into contact with the lock canceller lever; and an extension member which extends from the other side of the fastening ring by a predetermined length to cause an end to selectively come into contact with or to be separated from the steering disk to restrict or release the rotational motion of the steering disk.

5. A seat belt retractor comprising:

the vehicle sensor device configured according to claim 1 to detect a change in the inclination of a vehicle and a change in the pulling-out acceleration of the seat belt webbing; and the spindle around which the seat belt webbing is wound, wherein the seat belt retractor rotates the pilot lever to be coupled to or decoupled from the steering disk based on the detected change in the inclination of the vehicle and the pulling-out acceleration of the webbing.

* * * * *